United States Patent [19]

O'Connor et al.

[11] Patent Number: 4,777,411
[45] Date of Patent: Oct. 11, 1988

[54] TOP/BOTTOM ACTIVE PINCUSHION CIRCUIT WITH RINGING INHIBIT

[75] Inventors: Edward P. O'Connor, Glen Ellyn; Kirk D. Oliver, Forest Park, both of Ill.

[73] Assignee: Zenith Electronics Corporation, Glenview, Ill.

[21] Appl. No.: 6,401

[22] Filed: Jan. 22, 1987

[51] Int. Cl.$^4$ .......................... H01J 29/56; H01J 29/70
[52] U.S. Cl. ..................................... 315/371; 315/405
[58] Field of Search ............... 315/370, 371, 403, 405, 315/408, 400

[56] References Cited

U.S. PATENT DOCUMENTS 3,982,156  9/1976  Monroe ............................... 315/400
4,707,640 11/1987  Onozawa et al. ................... 315/408

FOREIGN PATENT DOCUMENTS 0058312  5/1977  Japan .................................. 315/370
0071135  6/1977  Japan .................................. 315/371

Primary Examiner—Theodore M. Blum
Assistant Examiner—Gregory C. Issing

[57] ABSTRACT

A top/bottom pincushion correction amplifier has an inhibit terminal that is coupled to vertical deflection means for receiving an inhibit pulse that corresponds to a vertical retrace pulse in the yoke. A vertical amplifier feeds the yoke in series with the secondary winding of a pincushion transformer, the primary winding of which is supplied with a pincushion correction signal from the pincushion amplifier. The effect of the retrace pulse in the yoke in causing ringing in the pincushion transformer is nullified by the inhibit pulse which increases the output impedance of the pincushion amplifier.

2 Claims, 1 Drawing Sheet

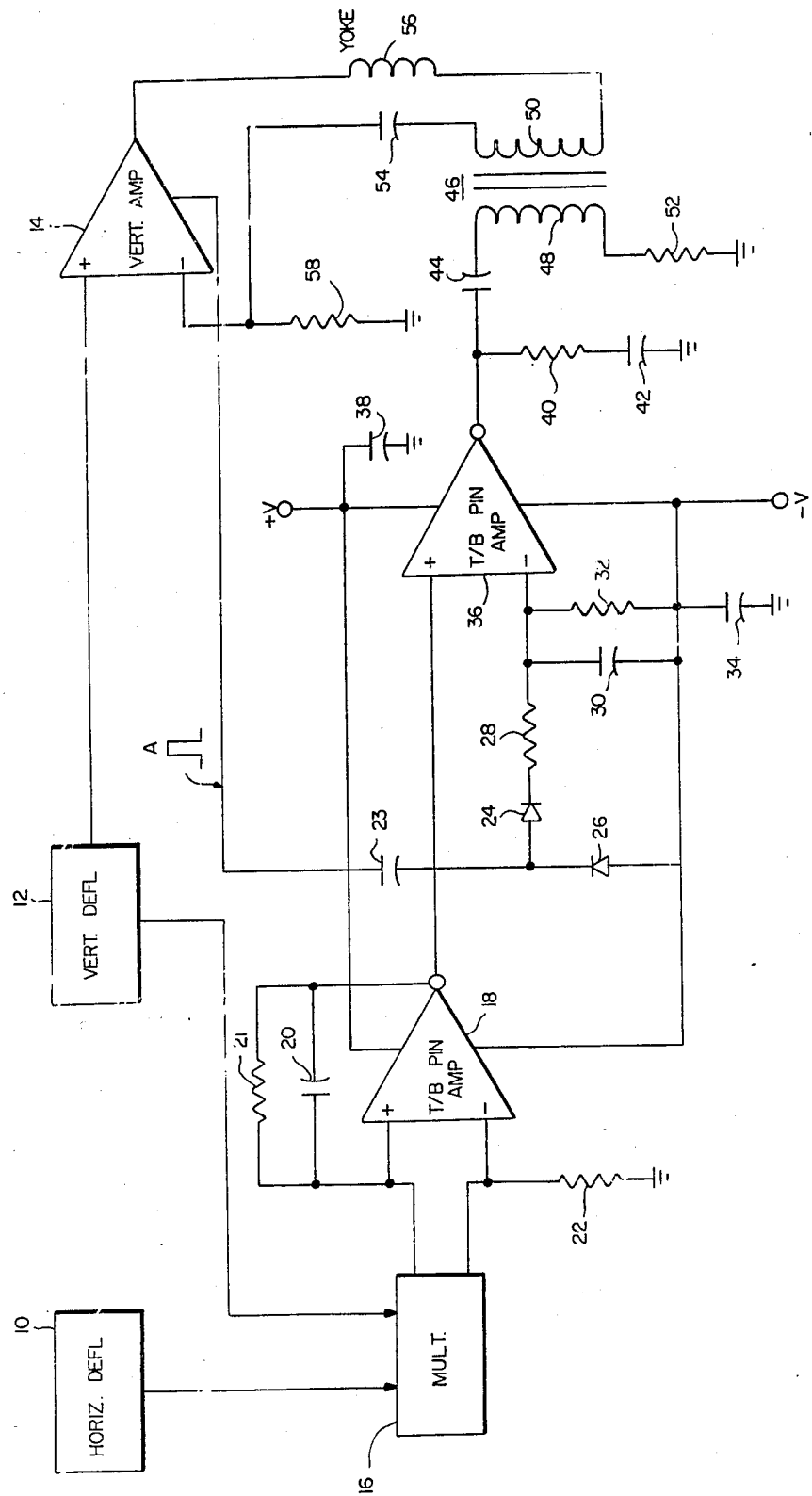

TOP/BOTTOM ACTIVE PINCUSHION CIRCUIT WITH RINGING INHIBIT

CROSS REFERENCE TO RELATED APPLICATIONS

This application is related to application Ser. No. 000,694, filed 1/6/87, entitled INDEPENDENT TOP/BOTTOM PINCUSHION CORRECTION CIRCUIT in the name of Kirk Oliver and assigned to Zenith Electronics Corporation.

BACKGROUND OF THE INVENTION AND PRIOR ART

This invention relates generally to top/bottom pincushion correction circuits and specifically to active top/bottom pincushion circuits.

As fully discussed in the copending application, the use of cathode ray tubes (CRTs) in video monitors that are driven by computers and the like has imposed stringent demands upon the shape and linearity of the generated rasters. These control demands and the desirability of achieving pincushion correction circuitry that is individually controllable for top and bottom correction are achievable wih the use of active devices in the pincushion correction signal generation circuits. In such circuits, a pincushion transformer has a secondary winding connected in series with the yoke and the vertical deflection amplifier. The transformer enables a pincushion correction current to be injected into the yoke. Difficulty can arise due to the low output impedance of the pincushion correction amplifier. Specifically, the primary winding of the pincushion transformer and the coupling capacitor connecting the transformer in the output circuit of the pincushion amplifier may resonate during occurrence of the large retrace pulse in the vertical deflection signal. The present invention provides a solution that is both simple and effective for inhibiting the ringing currents that would normally be generated.

OBJECTS OF THE INVENTION

A primary object of the invention is to provide an improved vertical deflection system.

Another object of the invention is to provide a novel vertical deflection circuit with top/bottom pincushion correction.

A further object of the invention is to provide a stable vertical deflection circuit including active top/bottom pincushion correction.

BRIEF DESCRIPTION OF THE DRAWING

These and other objects and advantages of the invention will be apparent upon reading the following description in conjunction with the drawing, the single figure of which is a combined block and schematic diagram of a vertical deflection circuit constructed in accordance with the invention.

DESCRIPTION OF THE PREFERRED EMBODIMENT

Referring to the drawing, a horizontal deflection circuit 10 and a verticl deflection circuit 12 supply respective horizontal rate ramp and pulse signals and vertical ramp signals to a multiplier 16 where a suitable top/bottom pincushion correction signal is developed. The pincushion generation circuit disclosed in the copending application may be used herein although other suitable correction signal generators may be substituted.

The multiplier drives a first pincushion amplifier 18 in differential fashion. Amplifier 18 has its positive (non-inverting) input connected to its output by means of a feedback capacitor 20 and a parallel connected resistor 21 and its negative (inverting) input connected to ground through a resistor 22. The output of amplifier 18 is supplied to the positive input of a second top/bottom pincushion amplifier 36, with both amplifiers being coupled between suitable source voltages +V and -V. The source voltages are coupled to ground by filter capacitors 34 and 38. The inhibit input of amplifier 36 is connected to -V by means of a parallel connection of a capacitor 30 and a resistor 32. A series arrangement of a diode 24, a diode 26 and a resistor 28 is connected across capacitor 30, with the junction of the diodes being returned, through a coupling capacitor 23, to a vertical power amplifier 14. Another output of vertical deflection circuit 12 supplies the positive input of vertical power amplifier 14, the output of which supplies a vertical yoke 56. A pincushion transformer 46 has a secondary winding 50 connected in series with yoke 56 and with a capacitor 54, the other terminal of which is returned to the negative input of vertical amplifier 14. A resistor 58 connects the negative input of amplifier 14 to ground. The primary winding 48 of pincushion transformer 46 has one end connected to ground through a current limiting resistor 52 and its other end connected by a coupling capacitor 44 to the output of pincushion amplifier 36. A series arrangement of a resistor 40 and capacitor 42 connects the output of pincushion amplifier 36 to ground. Resistor 40 and capacitor 42 help to stabilize the output of amplifier 36.

In operation, multiplier 16 develops a conventional-looking top/bottom pincushion correction signal in association with other means, not shown. The pincushion correction signal is suitably amplified by amplifiers 18 and 36 and applied to winding 48 of transformer 46. The conventional top/bottom pincushion correction signal comprises a horizontal rate ramp, the phase, amplitude and tilt of which can be controlled for removing the pincushion distortion at the top and bottom of the CRT raster, also not shown. The correction signal produces a horizontal rate parabolic correction signal in yoke 56 for modifying the vertical deflection waveform.

When amplifier 36 is operating, it presents a relatively low output impedance to ground. This low impedance is in series with capacitor 44, primary winding 48 and current limiting resistor 52. The effect of the large vertical retrace pulse current in the yoke may result in ringing in the resonant circuit comprising primary winding 48 and coupling capacitor 44. (The vertical retrace pulse is coupled by secondary winding 50 of the pincushion transformer 46.) Resistor 52 is very small and has little effect on the ringing, which results in an oscillatory change in current at the beginning of retrace ard manifests itself on the CRT raster as a series of expanded and compressed horizontal lines. The diodes 24 and 26 serve to couple an inhibit pulse A to the inhibit input of amplifier 36. The inhibit pulse A is related to the vertical retrace pulse, but need not be identical thereto. Resistors 28 and 32 and capacitor 30 stretch out the inhibit pulse slightly to assure that the amplifier is disabled for a time sufficient to dissipate any residual ringing energy before being re-enabled. While suitable damping may be used to control the magnitude of the ringing, the invention applies an inhibit pulse to the inhibit terminal of amplifier 36 to cut it off during retrace, which causes its output impedance to increase significantly. Since this output impedance is in series with capacitor 44 and primary wnding 48, it inhibits the ringing.

The pincushion transformer and coupling capacitor are essentially output means, driven by the pincushion amplifier, and subject to ringing as the result of the large retrace pulse in the yoke. Ringing is inhibited by applying an inhibit pulse, corresponding to the retrace pulse, to the inhibit input of the pincushion amplifier.

What has been described is a novel pincushion correction circuit for a vertical deflection system that inhibits ringing induced in the pincushion transformer by the vertical deflection retrace pulse. It is recognized that numerous changes and modifications in the described embodiment of the invention will be apparent to those skilled in the art without departing from its true spirit and scope. The invention is to be limited only as defined in the claims.

What is claimed is:

1. A vertical deflection circuit comprising:
   a source of vertical deflection signal including a vertical retrace pulse;
   a vertical yoke supplied with said vertical deflection signal;
   a pincushion amplifier;
   a source of top/bottom pincushion correction signal coupled to the input of said pincushion amplifier;
   output means, comprising a pincushion transformer having one winding connected to said pincushion amplifier and another winding connected in series with said vertical yoke, driven by said pincushion amplifier for coupling said pincushion correction signal to said yoke, said output means undesirably experiencing ringing resulting from said vertical retrace pulse;
   said pincushion amplifier having an inhibit terminal and exhibiting a high output impedance when it is inhibited; and
   means supplying a vertical retrace pulse to said inhibit terminal for damping said ringing.

2. A vertical deflection circuit comprising a source of vertical deflection signal including a retrace pulse, a yoke supplied with said vertical deflection signal, a pincushion correction amplifier having an inhibiting input terminal and a non-inhibiting input terminal and a pincushion transformer having a primary winding coupled across the output of said pincushion correction amplifier and a secondary winding connected in series with said yoke;
   a source of top/bottom pincushion correction signal coupled to the non-inhibiting input of said pincushion amplifier; and
   means coupling an inhibit pulse, corresponding to said retrace pulse to the inhibiting input terminal of said pincushion correction amplifier, said pincushion amplifier, when inhibited, presenting a high output impedance in series with said primary winding for inhibiting ringing therein in the presence of said vertical retrace pulse in said yoke.

* * * * *